United States Patent [19]

Brovold

[11] Patent Number: 4,754,906

[45] Date of Patent: Jul. 5, 1988

[54] SYSTEM FOR MANUFACTURING CONNECTING RODS

[75] Inventor: Thomas E. Brovold, Eden Prairie, Minn.

[73] Assignee: MTS Systems Corporation, Minneapolis, Minn.

[21] Appl. No.: 24,608

[22] Filed: Mar. 11, 1987

[51] Int. Cl.4 ............................................. B26F 3/00
[52] U.S. Cl. ..................... 225/103; 29/252; 74/579 E; 225/2
[58] Field of Search ...................... 225/103, 2; 29/252, 29/239, 413, 156.5 A; 74/579 E; 166/55.2, 55

[56] References Cited

U.S. PATENT DOCUMENTS

| 1,630,759 | 5/1927 | Pierce, Jr. | 225/103 X |
| 3,727,599 | 4/1973 | Sugiki et al. | 225/103 X |
| 3,994,054 | 11/1976 | Cuddon-Fletcher, et al. | 74/579 E X |
| 4,094,181 | 6/1978 | Westberg | 225/103 X |
| 4,569,109 | 2/1986 | Fetouh | 29/156.5 A |
| 4,684,267 | 8/1987 | Fetouh | 74/579 E X |
| 4,693,139 | 9/1987 | Mukai et al. | 74/579 E |

Primary Examiner—Frank T. Yost
Attorney, Agent, or Firm—Kinney & Lange

[57] ABSTRACT

A two part tool fits into the crankshaft bore of a partially manufactured connecting rod for an internal combustion engine and expands the bore to break the bore housing into two pieces, one of which comprises a bearing cap to permit installation of the rod onto a crankshaft journal. The tool is retracted to fit within the bore for the bearing and a high pressure acts on a piston to provide a high enough force to move two parts of the tool away from each other in direction perpendicular to a bisecting plane that lies along the central axis of the bore and to split the one piece bearing housing into two parts along a place defined by notches which weaken the bearing housing in selected areas. The piston is centered on the bisecting plane of the connecting rod so that the forces are balanced to ensure uniform, repeatable operation. The movement (displacement) of the tool portions and the load on the tool portions are both sensed for control of the test, and also to permit obtaining data on load and displacement relationships for quality control of the parts.

15 Claims, 1 Drawing Sheet

SYSTEM FOR MANUFACTURING CONNECTING RODS

BACKGROUND OF THE INVENTION

1. Field of the Invention

The present invention relates to a device for making split bearing assemblies in connecting rods, in particular by cracking a continuous bearing housing into two parts to provide a properly fitting bearing cap during manufacture of the connecting rods.

2. Description of Prior Art

A recent development in manufacturing connecting rods is to forge the rod in one piece including a one piece annular bearing housing having a central bore for the connection to a crank shaft journal, and then exerting a force from the interior of the bore to crack the continuous bearing housing into two sections to form a bearing cap so that the rod can be installed on a crankshaft journal. When properly broken, the two parts of the bearing housing will fit back together exactly as they separated with only a slight distortion of the bore. The cap can then be bolted in place and the bore honed to its final dimension. The internal bore in the continuous bearing housing is generally notched at diametrically opposed positions where the crack is to take place to insure that the breaks will be along a diametrical line. High speed, reliable and repeatable production is important in order to keep manufacturing costs low.

At the present time, a typical system for breaking the bearing housings for connection rods is shown in U.S. Pat. No. 4,569,109. The overall process is explained in that patent. In that device, a typical wedge system is used for breaking the bearing housing, wherein a wedge is placed between two dies that separate as the wedge is driven into place. The dies exert forces generally perpendicular to a bisecting plane lying along the axis of the bore. However, wedges will tend to create bending moments in the members forming the bore, and there is friction which makes it difficult to control the load applied to the part. The friction can cause the wedges to tend to weld themselves together. The wedges fail to provide uniform forces, causing problems in manufacture, such as distortions, and incorrectly cracked bearing housings. Thus the scrap rate is relatively high, and the process is slow, and not easily controlled.

SUMMARY OF THE INVENTION

The present invention relates to a hydraulically operated tool that can be placed on the interior bore of a unitary peripheral member, such as the bearing housing surrounding a bore opening of a partially manufactured connecting rod, and exert forces generally perpendicular to a bisecting plane lying along the axis of the bore to elongate the bore and create tension in the housing on opposite sides of the bore to cause the peripheral member or housing to fail and break into two parts in a desired manner.

Typically, the peripheral member will have notches formed in the regions where failure is to occur, and these notches will be diametrically opposed. That is, both of the notches will lie along the bisecting plane that is parallel to the bore axis and which forms a reference plane for forces of the tool set that is used for separating the peripheral member defining the bore. As shown, one of the tool portions has a fluid pressure cylinder defined therein, and a piston is slideably mounted in the cylinder and is sealed with respect thereto so that fluid pressure introduced between the inner end of the cylinder or chamber and the piston will tend to force the piston out of the chamber. The opposite end of the piston in turn bears against a second tool portion, so that as pressure tends to separate the piston from the first tool portion this force is transmitted back to the second actuator portion causing the two tool portions to tend to separate and exert a force to crack the peripheral members in which the tool is operating.

The tool portions are positioned so that the fluid pressure, and the central line or axis of the force from the piston lie along the bisecting plane of the bore that is perpendicular to the bore axis. This ensures that there are no bending moments exerted on the peripheral continuous member that has the bore defined therein, and the true tension will be exerted on the parts to cause failure in the proper region.

The tool is relatively easy to make, and the parts can be rapidly inserted and replaced. This means that production time can be speeded up. Using servocontrols for the pressure intensifier system, and using load and stroke feedback signals results in precise control for breaking the parts. Abnormalities in the forces and displacements required for cracking the parts can be observed to determine whether or not the part is faulty.

The system ensures properly broken parts that will fit back together exactly as they separated, and after which slight honing can be done to provide the percise dimensions needed for connecting rod operation. The tool system is adaptable for either brittle fractures using one load cycle or for cycling the members to cause fatigue breaks, generally under a low number of cycles.

DETAILED DESCRIPTION OF THE PREFERRED EMBODIMENTS

Figure 1:
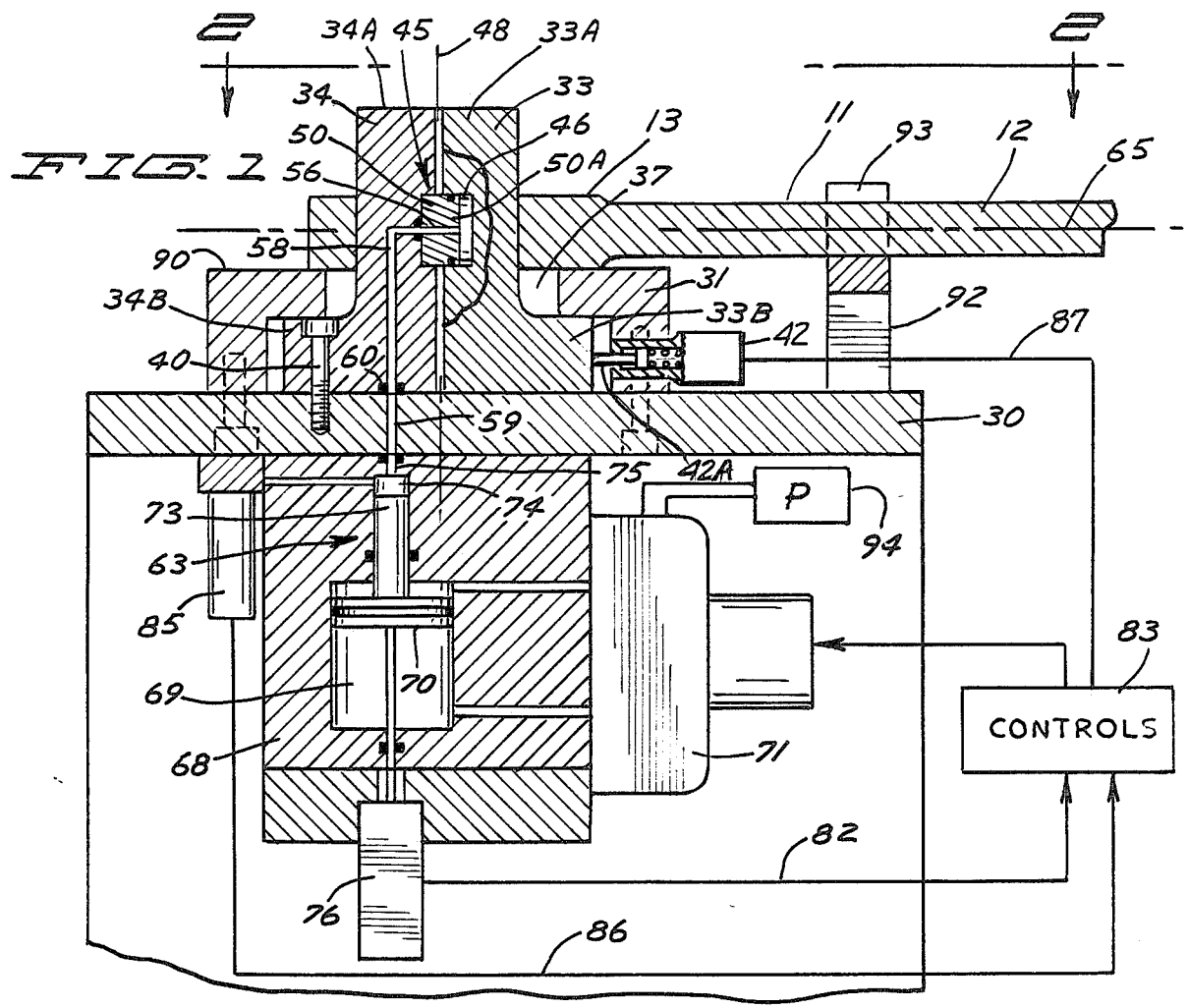
FIG. 1 is a schematic sectional view of a tooling system made for cracking connecting rod bearing housings, made according to the present invention.
Figure 2:
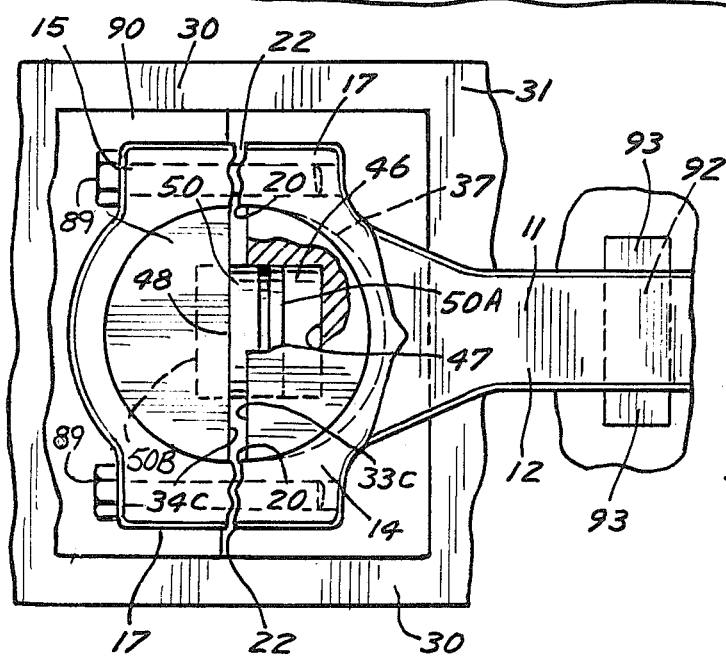
FIG. 2 is a top plan view of the tooling system of FIG. 1 showing a rod bearing housing that has been cracked but still is in place on the tooling.
Figure 3:
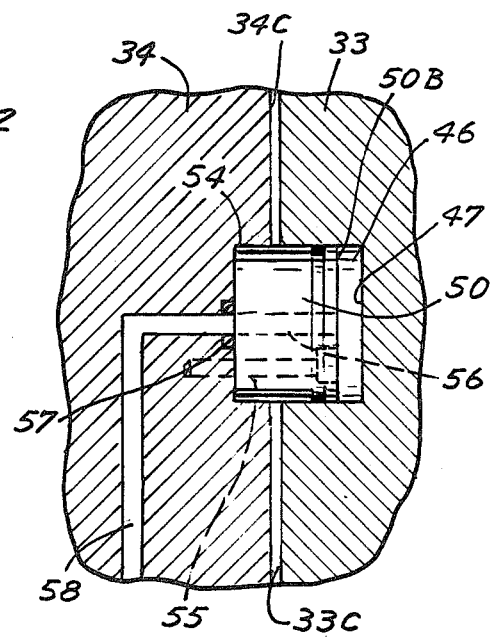
FIG. 3 is an enlarged fragmentary view showing a piston and cylinder assembly used for the tooling system of FIG. 1.

FIG. 1 shows a tool system indicated generally at 10 for separating housings comprising unitary peripheral members that have a bore defined therein into two parts and "cracking" them at desired locations. The actuator system 10 is used primarily for the process of manufacturing connecting rods indicated generally at 11 for the automotive industry. Connecting rods generally have a connecting link 12 that extends from the piston end of the connecting rod (not shown) to a bearing hub or housing 13 that is used for providing a bearing surface on crank shaft journals. As can be seen as FIG. 2, the bearing hub or housing 13 is to be formed into two separate parts comprising a yoke 14, and a bearing cap 15. In the initial stages of manufacture, the hub or housing 13 is one continuous peripheral member having an internal bore 16 therein through which the crank shaft journal will extend. The sides of the hub 13 have bosses 17 thereon in which cap screws for holding will be placed, after separation, the bearing cap portion 15 onto the yoke 14. The housing 13 is also provided with notches 20 on the interior surface defining bore 16. The notches 20 are on diametrically opposite sides of the bore, generally half way along the length of the bosses 17 to provide a crack inducing stress raiser to insure that the cracks indicated at 22 are properly formed.

In the process of manufacturing connecting rods, the rod 11 is forged in one piece, and the bore 16 is either forged in or premachined in. The bearing housing 13 then has to be cracked, and the tool system 10 is then used. The tool system 10 comprises a support base 30 that can be table mounted or otherwise supported in place, and which has a ring type encircling guide flange 31 mounted thereon in a suitable manner. The guide flange 31 can be split in half and fastened down to the support 30. Two tool portions indicated at 33 and 34 respectively are mounted on the support 30. The two portions 33 and 34 have part cylindrical column members 33A and 34A respectively that protrude upwardly through an elongated opening 37 in the guide flange 31. The tool portions also have rim type bases 33B and 34B at the lower ends thereof. The rim base on a first tool portion 33 is shown at 33B and is slidably mounted on the top of support 30 and underneath an overhanging lip of the guide or flange 31 so that it can slide relative to the guide flange and relative to the second tool portion 34. The flange 34B of the second tool portion is fixed with suitable cap screws 40 to the support 30.

A displacement transducer 42 is mounted on the guide 31 and the sensing element of the transducer is connected to a spring loaded plunger 42A that rests against the first tool portion 33. The spring load urges the tool portion 33 toward the second tool portion 34. The transducer 42 directly indicates movement of the tool portion and therefore directly indicates any elongation or motion of the bearing housing 43. The displacement signal is used for one control input in the system.

The separating force required for breaking or cracking the continuous peripheral member is provided through a pressure intensifier system acting on a hydraulic piston-cylinder actuator arrangement indicated generally at 45 that acts between the two tool portions. A chamber or cylinder 46 is formed in the first tool portion, and has an inner end surface 47. The chamber 46 opens to the surface 33C of the tool portion 33 that faces surface 34C of tool portion 34. The surfaces 33C and 34C are adjacent to and parallel to a bisecting diametrical plane that lies along a central axis 48 of the bore 16. A piston 50 is slidably mounted in the chamber 46, and has a suitable seal 51 that seals against the interior surface of the chamber 46. The piston 50 can slide in and out relative to the end surface 47 of the chamber 46 when hydraulic fluid under pressure is introduced into the chamber between the surface 47 and the adjacent, inner end 50A of the piston.

The piston 50 has a base end 50B that is mounted in a receptacle 54 defined in the second tool portion 34, so that the forces on the piston end in chamber 46 are reacted through the base portion of the piston to the second tool portion 34. The piston 50 can be held in place in the second tool portion 34 in any suitable manner. As schematically illustrated, a screw 55 can be used to hold the piston in place.

The piston 50 has an internal passageway 56 therethrough that opens into the chamber 46, and this passageway is connected with a suitable O-ring seal 57 to a passageway 58 on the interior of the second tool portion 34. Passageway 58 has a vertical portion that mates with a passageway 59 defined through the support 30, which passageway 59 in turn is connected through suitable seals to the outlet passageway 60 of a pressure intensifier system indicated generally at 63. The passageways 56, 58, 59 and chamber 46 can be filled with oil or other pressure transferring material by providing a bleed screw (not shown) opening to chamber 46 to permit bleeding air out of the chamber. The pressure intensifier system 63 is made to raise the pressure in passageway 58, and thus in passageway 56, to a level in the range of at least 30,000 psi in order to obtain enough force to carry out the cracking or breaking operation, while keeping the tool operating piston and cylinder 45 to a reasonable size in relation to the axial length of the bearing housing 13 as measured along the axis 48 of the bore of the connecting rod.

It can be seen that the bisecting plane of the connecting rod 11 that is perpendicular to the axis 48 and which is indicated by the line 65 is coincindental with the central axis of the chamber 46 and piston 50. The force generated by the piston and cylinder arrangement 45 acts along the bisecting plane 65 of the connecting rod being worked on so that there are no bending moments or overturning moments exerted on the connecting rod 11 during the breaking operation.

The intensifier system 63 as shown provides a high pressure in the chamber 46 in relation to the force used to actuate it. In the form shown, source pressure acts on a large piston, which in turn provides force acting on a much smaller size second intensifier piston to generate high pressures. As shown, the intensifier system 63 comprises a housing 68 that has an internal chamber therein shown at 69 that forms an actuator including a large internal piston 70. A servovalve 71 is provided for controlling pressure to the bottom of the piston 70. The piston 70 in turn has a substantially smaller diameter intensifier plunger or second piston 73 operating in a bore 74 in the housing 68. The bore 74 is open through a short passageway 75 in the housing 68 to the passageway 59, and thus to the passageway 58 and into the chamber 46. The piston 70 can be replaced with another type of force creating member if desired.

A displacement transducer (LVDT) shown at 76 is mounted on the housing 68, and has a rod connected to the end of the piston 70. The LVDT rod is suitably slidably sealed so that it will not cause a pressure leak, but will move to indicate the position of the piston 70 and provide a feedback signal along the line 82 to servovalve controls 83 that are shown only schematically. A pressure sensing passageway 84 is provided in the housing 68 and opens to the intensifier bore 74. A pressure transducer 85 is connected to passageway 84 that provides a load feedback signal along a line 86 to the controls 83. The transducer 42 also provides a feedback signal to controls 83 along line 87. The displacement of the tooling, and thus the displacement of the rod bearing housing 13 in relation to the pressure generated in the intensifier (the load) can be used to determine material charactersitics of the part being broken. These signals can be used to analyze whether the bearing housing 13, or other continuous peripheral member that is being split, meets the necessary strength, elasticity, brittleness, or other characteristics desired.

In operation, the servo-valve 71 will be set so that there is essentially no pressure in the chamber 46. The spring or bias member 42 will retract the two tool portions so that the facing surfaces 33C and 34C are closely adjacent, but separated along the parting, diametrical plane lying on the axis 48. A connecting rod 11 will be mounted into position, resting on the top surface 90 of the guide 31, and on a suitable orienting rest shown generally at 92 which is provided for supporting the link portion 12 of the crank while the hub or housing 13 surrounds the tool portions 33 and 34. The rod is supported independently of the tool portions to avoid any bending moments on the hub or housing 13. The link 12 is angularly oriented as well, for example, by placing it between guide blocks 93 that ensure the notches 20 are on the desired diametrical plane perpendicular to the axis of piston 50.

The servo-valve 71 can then be energized in accordance with a predetermined program, or manually, to direct pressure from a source 94 to the base end of the piston 70, urging the piston 70 to compress the fluid that is in the intensifier chamber 74, creating a pressure in the chamber 46 acting against its end surface 47 and the adjacent end of the piston 50 to force the first tool portion 33 away from the second tool portion 34 and open the gap between surfaces 33C and 34C, which lie parallel to the parting plane and are perpendicular to the axis of piston 50. Adequate force can be obtained because of the pressure generated by the intensifier sections 73 and 74 to elongate the hub or bearing 13 and cause the cracks or breaks 22 as the piston 50, its cylinder, comprising an actuator 45 for the tool portions, exert forces generally perpendicular to the diametrical plane aligned with the notches 20, and which passes through the axis 48 of the bore 16.

By sensing when elongation occurs in the part because the tooling portion 33 moves and the LVDT 42 senses the movement, the conditions at occurance of the crack 22 can be analyzed and determined. Load will drop when yield occurs. The break or elongation will be sensed by the transducer. The servo-valve 71 can be controlled to control piston 70 through the controls 83, and the spring will retract the sliding tool portion 33 so that the rod, now having a bearing cap 15 formed as part of the bearing housing, can be removed and a new rod put into place. The rod is normally provided with screws or bolts that will be used for holding the separated cap in place. The bolts are relatively loose so they do not become stressed during cracking of the rod. The rod then will be further processed by tightening the cap screws or bolts to clamp the bearing cap 15 onto yoke portion 14 at the desired load and then finish honing the bore to the desired size.

The characteristics of the displacement of tooling part 33, as sensed by transducer 42 versus the pressure signal from transducer 85 can be used to determine whether or not the continuous peripheral member or bearing housing being broken is up to specifications of the material. For example, the housing 13 could elongate too much or if a very low pressure was necessary for fracturing it, defective material may be indicated. This information can be collected with data acquisition and used for statistical decision making on each part. Thus, quality control inspection of 100% of the parts is possible.

The small actuator that is used can generate very large forces, and the losses due to friction are minimal. The mechanical advantage can be varied easily by varying the ratios of the intensifier piston 73 relative to the actuator piston 70. The support 30 and other portions of the frame do not have to react the load that is transmitted to the part that is being split. The motion that is needed for cracking a rod is very small, so that the trapped oil volume in passageways 58, chamber 46, and the intensifier chamber 74 can be kept to a minimum to keep the stiffness of the tooling high in relation to the stiffness of the part being worked on. High stiffness in the system insures that the transducers, such as the pressure sensor 85 and the LVDT or transducer 42, provide data precisely representative of the conditions at the part and do so with more accuracy than prior art tool actuators, such as wedges. The tooling is easy to change because it is bolted to the top of the base plate or support 30, which also functions as a frame. Different size bores can easily be accommodated with different size tooling.

Various guidance systems for the part being processed can be used, for providing sliding movement of the movable tool portion. While the two tool portions are shown as half cylinders split along a longitudinal plane, other segments of cylinders could be used. When the break is to be on opposite sides of the hub and diametrically opposed (that is, the break is to be on a diameter) half cylinders are the best arrangement. In some instances, the controls 83 can be programmed to fatigue fail the bearing housing 13. The part may be cyclically loaded two or three times before fracture by controlling the pressure displacement or time cycle and having the servo-valve programmed to repeat the needed cycle.

A much more accurate level of repeatability of loading then previous methods can be obtained. The variable effects of friction are avoided. Also, because oil will expand when the high pressure in chamber 46 is released, substantial movement of the tooling can occur without having any movement of piston 70, and the displacement transducer 42 will sense such movement directly so the motion can be controlled. Also, if one side breaks first, one of the bolts 89 will carry some load. These loads can be controlled, as well.

Using the same intensifier system, reasonable ranges in forces required for different connecting rods can be accomodated by changing the size of the piston 50 and chamber 46.

The operation is essentially frictionless because of the hydraulic operation and the guide 31 usually has to react to only minor loads that may occur as overturning moments if the part breaks on the top or bottom first.

Although the present invention has been described with reference to preferred embodiments, workers skilled in the art will recognize that changes may be made in form and detail without departing from the spirit and scope of the invention.

What is claimed is:

1. A tool operating on the internal bore of a continuous peripheral member providing forces in opposite directions along a bisecting plane lying on the axis of the bore tending to break the continuous member comprising:
    first and second tool portions separated from each other along a plane generally parallel to said bisecting plane, at least one of said tool portions being slidably mounted relative to the other;
    one of said tool portions having a bore defining an enclosed chamber therein having a closed end surface and an opening facing the other tool portion;
    a piston mounted in said chamber and having a first surface facing the closed end surface of said chamber, and a second surface engaging said first tool portion; and
    means for providing a fluid under pressure to the interior of said chamber between the first surface of said piston and the inner surface of said chamber to tend to push said first and second tool portions apart in direction perpendicular to said bisecting plane.

2. The apparatus as specified in claim 1 wherein said piston is fixedly mounted on said first tool portion and is slidably engaged in the chamber on said second tool portion.

3. The apparatus as specified in claim 2 wherein said means for providing a fluid under pressure comprises a passageway in said first tool portion and through said piston to the chamber, a support fixedly mounting the first tool portion, and pressure intensifier means mounted on said support and open to said passageway and said intensifier means for providing pressure in the passageway generated from a force acting on a separate input portion of said intensifier means.

4. The apparatus as specified in claim 3 and means for generating the force acting on a separate input portion of the intensifier means comprises a separate hydraulic actuator having a first piston, said intensifier having a second pistion of substantially smaller size than the first piston whereby the pressure exerted in the passageways is substantially greater than the pressure acting on the first piston.

5. The apparatus as specified in claim 4 and displacement feedback means to sense the relative positions of said tool portions.

6. The apparatus as specified in claim 5 and means to sense the pressure in said passageway.

7. The apparatus as specified in claim 1 wherein said continuous member has a length measured along the axis of said bore, and said chamber is substantially centered on a bisecting plane of the continuous member perpendicular to the bore axis.

8. A tool system for exerting a force on a continuous peripheral member to be cracked apart and having a central bore, said force being exerted in directions perpendicular to a plane bisecting the bore and parallel to a central axis around which the bore is defined, said tool system comprising two tool portions together defining a peripheral surface complemental to an interior bore surface defined in a continuous member that is initially placed on said tool portions, means to movably guide at least one of said tool portions for movement generally perpendicular to such bisecting plane, and pressure responsive actuator means cooperative between said first and second tool portions to move one of said tool portions away from the other as guided by the means to movably guide when a continuous peripheral member to be cracked apart is in position on the tool portions.

9. The system as specified in claim 8 wherein said bore is a circular bore.

10. The system as specified in claim 8 wherein said bore comprises a bore in a connecting rod for internal combustion engines.

11. The system of claim 8 wherein a member to be cracked has a second bisecting plane perpendicular to the axis of the bore and said actuator means comprises a piston and cylinder having an axis of movement lying in the second bisecting plane to exert force parallel to said second bisecting plane when the actuator means is operated.

12. The system as specified in claim 8 and first means for providing a signal representing the relative positions of the first and second tool portions, and second means for providing a signal representing the force being exerted on the tool portions tending to separate the tool portions.

13. A tool for breaking a bearing housing of an internal combustion engine connecting rod having an internal bore, the bearing housing initially being a continuous peripheral member, comprising:
first and second tool portions mounted on a support, at least one of said tool portions being movably mounted relative to the other and together the tool portions having an exterior shape complemental to said bore;
fluid pressure actuator means operable between said tool portions and operable to create a force tending to separate the tool portions when the tool portions are in a first adjacent position;
said tool portions together fitting within the bore when in the first position;
means to position a connecting rod having a bearing housing to be broken with the bearing housing surrounding the tool portions; and
means for actuating the actuator means to separate the tool portions and create a force to break the bearing housing into two parts.

14. The apparatus as specified in claim 13 wherein said bearing housing has a length measured along the axis of said bore, and said actuator means provides a force along a central axis, said central axis being substantially centered on a bisecting plane of the connecting rod extending perpendicular to a central axis of the bore.

15. The apparatus of claim 14 wherein said means for actuating comprises a pressure generating means including a small diameter cylinder and a piston movable in the cylinder in response to a force on the piston to provide a premise for the fluid pressure actuator means.

* * * * *